US010565237B2

(12) United States Patent
Hui et al.

(10) Patent No.: US 10,565,237 B2
(45) Date of Patent: Feb. 18, 2020

(54) LOGICAL SEGMENTATION DATA PROCESSING SYSTEM

(71) Applicant: Google LLC, Mountain View, CA (US)

(72) Inventors: Cong Hui, Mountain View, CA (US); Markus Breitenbach, Mountain View, CA (US); Evan Colin Purcell, Mountain View, CA (US)

(73) Assignee: Google LLC, Mountain View, CA (US)

( * ) Notice: Subject to any disclaimer, the term of this patent is extended or adjusted under 35 U.S.C. 154(b) by 128 days.

(21) Appl. No.: 15/549,922

(22) PCT Filed: Jun. 5, 2017

(86) PCT No.: PCT/US2017/035947
§ 371 (c)(1),
(2) Date: Aug. 9, 2017

(87) PCT Pub. No.: WO2018/226204
PCT Pub. Date: Dec. 13, 2018

(65) Prior Publication Data
US 2018/0349411 A1    Dec. 6, 2018

(51) Int. Cl.
*G06F 7/00*        (2006.01)
*G06F 17/30*       (2006.01)
(Continued)

(52) U.S. Cl.
CPC .......... *G06F 16/29* (2019.01); *G06F 16/248* (2019.01); *G06F 16/24578* (2019.01); *H04W 4/021* (2013.01)

(58) Field of Classification Search
CPC .......... G06F 17/30241; G06F 17/3053; G06F 17/30554; G06F 16/24578; G06F 16/248;
(Continued)

(56) References Cited

U.S. PATENT DOCUMENTS 8,442,716 B2 * 5/2013 Epshtein ............. G06F 16/9537
701/33.4
2012/0271734 A1  10/2012 Foassan
(Continued)

FOREIGN PATENT DOCUMENTS

WO    WO2015/187895    12/2015

OTHER PUBLICATIONS

International Search Report and Written Opinion issued in International Application No. PCT/US2017035947, dated Jan. 31, 2018, 14 pages.

*Primary Examiner* — Azam M Cheema
(74) *Attorney, Agent, or Firm* — Fish & Richardson P.C.

(57) ABSTRACT

A logical segmentation data processing system includes a data retrieval interface configured to receive, from a remote geo-caching data system, geo-caching data representing geographic locations specified by the remote geo-caching data system. The data processing system includes a logical segmentation engine configured to segment a geographic map into geo-areas, each geo-area comprising a subset of the geographic locations represented by the geo-caching data. The data processing system includes an evaluation engine configured to rank, for each of a plurality of the geo-areas, geographic locations in that geo-area. The data processing system includes an aggregation engine configured to select, from each of the plurality of geo-areas, one or more geographic locations with a higher ranking, relative to the rankings of other geographic locations in that geo-area, and to aggregate the selected geographic locations.

29 Claims, 8 Drawing Sheets

(51) Int. Cl.
*G06F 16/29* (2019.01)
*H04W 4/021* (2018.01)
*G06F 16/248* (2019.01)
*G06F 16/2457* (2019.01)

(58) Field of Classification Search
CPC ...... G06F 16/29; G06F 16/9537; G06F 19/00; H04W 4/021
See application file for complete search history.

(56) References Cited

U.S. PATENT DOCUMENTS

| | | |
|---|---|---|
| 2013/0024271 A1 | 1/2013 | Wooden et al. |
| 2014/0278946 A1 | 9/2014 | Powell et al. |
| 2015/0095355 A1 | 4/2015 | Patton |
| 2015/0269848 A1* | 9/2015 | Yuen ..................... G09B 19/00 434/236 |

* cited by examiner

LOGICAL SEGMENTATION DATA PROCESSING SYSTEM

CROSS-REFERENCE TO RELATED APPLICATION

This application is a National Stage Application under 35 U.S.C. § 371 and claims the benefit of International Application No. PCT/US2017/035947, filed Jun. 5, 2017. The disclosure of the foregoing application is hereby incorporated by reference in its entirety.

BACKGROUND

Geo-caching applications include augmented reality and location-based applications that use Global Positioning System (GPS) data for one or more features of the application. Geo-caching applications determine a geographic location of a device that is operating the application. Geo-caching applications can specify nearby GPS coordinates that correspond to features of the geocaching application. The geo-caching application can enable a user of the application to interact with the features when the device of the user is nearby the specified coordinates.

SUMMARY

The data processing system described by this document provides one or more of the following advantages. The data processing system enables geo-caching data systems to load-balance foot traffic between geo-points (e.g., promoted locations of interest of the geo-caching data system) by segmenting a geographic map into geo-areas. Users of the geo-caching data system are attracted to the geo-points of the geo-caching data system. Participants (e.g., owners of geographic locations) of an application of the geo-caching data system want to attract users of the geo-caching data system to their geographic location by being at a geo-point location. Unlike websites, the geographic locations are constrained by the load (e.g., amount of foot traffic) acceptable to a geographic location and the proximity of the users to the geographic location. The data processing system enables the geographic locations to attract a manageable load by segmenting the geographic locations into geo-areas. The data processing system selects (e.g., promotes) a particular geographic location in the geo-area to be a geo-point of the geo-caching data system, attracting users of the geo-caching data system to the geographic location.

The data processing system manages load for geo-points (e.g., promoted geographic locations) by adjusting the frequency in which geographic locations are selected as geo-points. The data processing system can restrict the selection of geo-points so that users of the geo-caching data system have a chance to visit the geographic location, but update the geo-point frequently enough that the geo-point does not become uninteresting to users.

The data processing system enables, by segmenting the map into geo-areas, the geographic locations to compete only with other nearby geographic locations to be a geo-point of the geo-caching data system. Geographic locations are thus competing for a local, manageable audience.

The data processing system enables the geo-caching data system to select geo-points that are interesting to users of the geo-caching data system. The data processing system associates geographic locations with quality scores that enable the geo-caching data system to promote geographic locations that provide a service to users and that the users are more likely to visit relative to other geographic locations.

The data processing system improves the quality of the geo-caching data system by enabling the geo-caching data system to select geographic locations that are interesting to users and that can serve the users. The geographic locations selected as geo-points are able to serve the users attracted by the geo-point of the geo-caching data system.

The logical segmentation data processing system includes a data retrieval interface that receives, from a remote geo-caching data system, geo-caching data representing geographic locations specified by the remote geo-caching data system; storage for storing quality score data for each of the geographic locations represented by the geo-caching data; a logical segmentation engine that segments a geographic map into geo-areas, each geo-area including a subset of the geographic locations represented by the geo-caching data; where the logical segmentation engine identifies a size of a geo-area by executing executable logic that identifies one or more parameter values that constrain physical load in the geo-area to be in accordance with a specified value; an evaluation engine that ranks, for each of a plurality of the geo-areas, geographic locations of that geo-area, with each geographic location being scored with an eligibility value, and with ranking being a function of eligibility values of the geographic locations, where the eligibility values are each weighted based on quality score data for each of the geographic locations; and an aggregation engine that selects, from each of the plurality of the geo-areas, a geographic location with a higher ranking, relative to one or more other rankings of one or more other geographic locations in that ranking, and that further aggregates selected geographic locations with higher rankings.

In some implementations, the aggregation engine generates geo-point data by generating a geo-point for coordinates of each of the selected geographic locations with higher rankings and sends the geo-point data to the remote geo-caching data system.

In some implementations, each geo-point of the geo-point data is associated with data representing one or more interactive features being accessible by a terminal device configured to communicate with the remote geo-caching data system.

In some implementations, the storage includes a database that stores activity data associated with each of the geographic locations represented by the geo-caching data, the activity data representing how often the one or more interactive features are accessed by one or more terminal devices configured to communicate with the remote geo-caching data system.

In some implementations, the eligibility values are each weighted proportionally to a value representing an amount of activity indicated by the activity data for each of the geographic locations.

In some implementations, the data processing system includes a timing engine that determines, for a geo-area, an evaluation schedule for the evaluation engine to rank the plurality of the geographic locations. In some implementations, the timing engine determines a duration of time according to the evaluation schedule. In some implementations, the logical segmentation engine segments the geographic map into alternative geo-areas at least once during the duration of time.

In some implementations, the quality score data for a geographic location represents a probability that the terminal device configured to communicate with the remote geo-caching data system requests data associated with the geographic location. In some implementations, the quality score data is based on a length of time during which the terminal device requests data associated with the geographic location.

In some implementations, the logical segmentation engine further determines a size of the geo-area based on a number of the geographic locations represented by the geo-caching data. In some implementations, each geo-area comprises a predetermined number of geographic locations.

In some implementations, the geo-caching data represents geographic locations from the remote geo-caching data system and another remote geo-caching data system, and where the aggregation engine sends the geo-point data to the remote geo-caching data system and the other remote geo-caching data system.

In some implementations, each geographic location specified by the remote geo-caching data system is associated with a tier score for the geographic location, and where an eligibility value for the geographic location is weighted proportionally to the tier score. In some implementations, the tier score specifies a conversion quality of the geographic location including one of: a first tier indicative of an interactive feature for the remote geo-caching data system being associated with the geographic location; a second tier indicative of the interactive feature for the remote geo-caching data system that comprises a time-based reward; and a third tier indicative of the interactive feature for the remote geo-caching data system that comprises a transaction at the geographic location.

In some implementations, the data processing system performs operations including receiving, by a data retrieval interface, from a remote geo-caching data system, geo-caching data representing geographic locations specified by the remote geo-caching data system; storing quality score data for each of the geographic locations represented by the geo-caching data; segmenting a geographic map into geo-areas, each geo-area including a subset of the geographic locations represented by the geo-caching data; identifying a size of a geo-area by executing executable logic that identifies one or more parameter values that constrain physical load in the geo-area to be in accordance with a specified value; ranking, for each of a plurality of the geo-areas, geographic locations of that geo-area, with each geographic location being scored with an eligibility value, and with ranking being a function of eligibility values of the geographic locations, where the eligibility values are each weighted based on quality score data for each of the geographic locations; and selecting, from each of the plurality of the geo-areas, a geographic location with a higher ranking, relative to one or more other rankings of one or more other geographic locations in that ranking, and that further aggregates selected geographic locations with higher rankings.

The details of one or more embodiments are set forth in the accompanying drawings and description below. Other features, objects, and advantages of the techniques described herein will be apparent from the description and drawings, and from the claims.

DESCRIPTION OF DRAWINGS

Like reference symbols in the various drawings indicate like elements.

DETAILED DESCRIPTION

Figure 1:
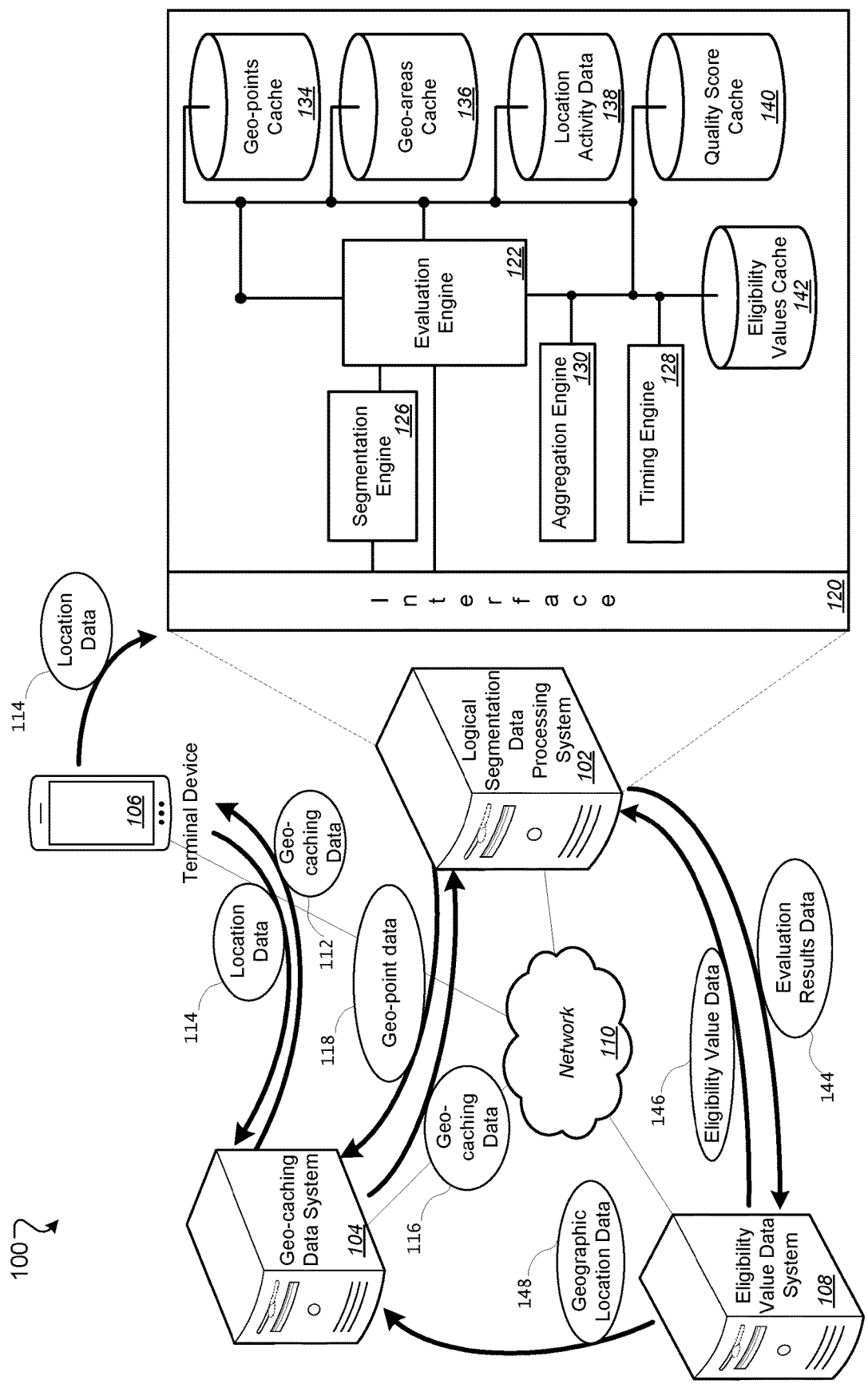
FIG. 1 is a conceptual diagram of a networked environment for a logical segmentation data processing system.

This document describes a data processing system for logical segmentation data processing. For example, the data processing system segments a geographic area (or map) into various segmented portion or areas (referred to herein as "geo-areas"). The data processing system identifies a size of a geo-area by executing executable logic that identifies one or more parameter values that constrain physical load in the geo-area to be in accordance with a specified value, as described in further detail below. By doing so, the data processing system conserves resources (e.g., bandwidth, memory consumption and data processing cycles and resources) by limiting the rendering of content (e.g., on display devices of terminal devices located within a geo-area) to be an amount that is specified as resulting in an acceptable amount of physical load for a geo-point in the geo-area. For example, the load for each geo-point is balanced such that a manageable number of users are requesting data related to a geo-point.

The data processing system receives data from and sends data to one or more geo-caching data systems. Geo-caching data include location-based augmented reality applications. The geo-caching data system includes geo-points. Geo-points correspond to GPS coordinates on a geographic map. The data processing system selects the GPS coordinates of geographic locations for the geo-points of the geo-caching data system. The geographic locations include physical locations that provide products, services, or both. In some implementations, the geographic locations include businesses. The data processing system segments the geographic locations into geo-areas. The data processing system selects, for each geo-area, the GPS coordinates of at least one geographic location to correspond to a geo-point of the geo-caching data system.

The geo-points include a feature of the geo-caching data system. Users of the geo-caching data systems can interact with the feature of the geo-caching data system when the users are physically at or nearby (e.g., within a distance threshold of) the GPS coordinates of the geo-point. A feature of the geo-caching data system can include an interactive aspect of the geo-caching data system that provides an incentive for users to visit the geo-point that includes the feature. In some implementations, an application of the geo-caching data system is a game and the features are how the user interacts with and plays the game. For example, a feature can include a resource, a checkpoint, an objective, or other interactive aspect of the application. In some implementations, features for each geo-point are unique. Users of the geo-caching data system are attracted to geo-points because the users can interact with the features of the geo-caching data system at the geo-points.

The geo-points thus provide an incentive for users to visit the geographic location (e.g., business) associated with the geo-point. In some implementations, increased load (e.g., foot traffic) for a geographic location correlates to increased sales of product or services at the geographic location, increased brand awareness, increased interest in the geographic location, and so forth. The data processing system enables geographic locations to compete to be geo-points in the application of the geo-caching data system and thus benefit from the increased load.

The data processing system enables geo-caching data systems to load-balance between geo-points by segmenting the geographic map into geo-areas. Unlike web locations (e.g., websites, online stores, etc.), the geographic locations are constrained by the load (e.g., amount of foot traffic) that is acceptable to the geographic location and the proximity of the users to the geographic location. The data processing system enables the geographic locations to attract a manageable load by segmenting the geographic map, that includes the geographic locations, into geo-areas for a specified period of time. The data processing system segments the geographic map into geo-areas using data provided by the geo-caching data system, such as activity data for the geographic locations. The data processing system segments a timeline into evaluation periods. The data processing system selects geo-points at a frequency indicative of the evaluation periods (e.g., once per period) to further manage the load at each geo-point, as described below.

Systems of the geographic locations can each submit an eligibility value (e.g., a bid) to compete to have the data processing system associate the respective geographic location with a geo-point of the geo-caching data system. The data processing system selects a geographic location that is likely to be of interest to users of the geo-caching data system. The data processing system thus enables the geo-caching data system to attract a manageable load to the geographic location at the geo-point for each geo-area during a specified time period. The data processing system enables the geo-caching data system to include geo-points that are interesting to users and selects geo-points at a frequency that is practical for the geographic location but that keeps users interested in the application of the geo-caching data system.

Referring to FIG. 1, networked environment 100 includes a logical segmentation data processing system (hereinafter the data processing system 102) that is configured to communicate (e.g., using network 110) with a geo-caching data system 104 and an eligibility value data system 108. The networked environment 100 includes a terminal device 106 that is configured to communicate over the network 110 with the geo-caching data system 104. Each of the data processing system 102, the geo-caching data system 104, and the eligibility value system 108 can include one or more computing systems, and server systems.

The data processing system 102 communicates with the geo-caching data system 104 over the network 110. The data processing system 102 receives geo-caching data 116 from the geo-caching data system 104. In some implementations, the data processing system 102 receives the geo-caching data 116 through an interface 120. The geo-caching data system 104 can include an application programming interface (API) that enables the data processing system 102 to access the geo-caching data 116 from the geo-caching data system 104. The data processing system 102 uses the geo-caching data 116 to perform an evaluation and generate geo-point data 118 representing the geo-points that are used by the geo-caching data system 104.

The geo-caching data 116 includes data of the geo-caching data system 104 that is used by the data processing system 102 to generate geo-point data 118 for the geo-caching data system 104. The geo-caching data 116 includes data indicative of how many potential geo-points should be in a geographic map for the geo-caching data system 104. In some implementations, the geo-caching data 116 includes a list of geographic locations that are participating as potential geo-points. The geo-caching data 116 includes location activity data for each of the geographic locations. The activity data is indicative of how many users visit one or more of the geographic locations. For example, the activity data may indicate that a given number of users visited a geographic location during a specified amount of time when the geographic location included a geo-point. The activity data is gathered by the geo-caching data system 104 from terminal devices 106 that have an application of the geo-caching data system 104 installed. The terminal device 106 provides location data 114 to the geo-caching data system 104. The geo-caching data system 104 can keep a record of the popularity of each of the geo-points at geographic locations and include this information in the activity data. In some implementations, the location data 114 is anonymized when received by the data processing system 102 and associated geolocations in a location activity data cache 138 of the data processing system 102.

The geo-caching data 116 can include information about each of the geographic locations registered with the geo-caching data system 104. For example, the geo-caching data 116 can include a type for each geographic location. A geographic location can include a restaurant, retail store, transportation hub, museum, etc. In some implementations, a geographic location is associated with other geographic locations (e.g., under a brand name, co-owner, etc.). The data processing system 102 can assign or update a quality score for a geographic location using the geo-caching data 116, as described below.

The data processing system 102 receives the geo-caching data 116 from the geo-caching data system 104 and generates geo-point data 118 for sending to the geo-caching data system 104. To generate the geo-point data 118, the data processing system 102 can perform segmentation, evaluation, and aggregation operations.

The data processing system 102 performs segmentation operations using a logical segmentation engine 126. The segmentation engine 126 segments the geographic map of the geo-caching data 116 into geo-areas. The geographic map is segmented to load balance between different geo-points and distribute geo-points efficiently in the geographic map according to one or more distribution parameters. A distribution parameter can be understood to be any parameter that may influence the likely level of user demand associated with that geo-area—for example, a parameter that is likely to influence the level of foot-fall and/or the time that users spend at locations within the geo-area. Distribution parameters include metrics such as geo-point density, load levels from activity data, population density, and so forth for a geographic map. It will be noted that the assignment of geo-points within an area may itself influence the level of user interest in that area; therefore, the number and/or the density of geo-points in a particular area may also be considered an example of a distribution parameter.

The segmentation engine 126 can segment the geographic map into geographic areas ("geo-areas") using various techniques. The segmentation engine 126 can, for example, segment the geographic map to generate geo-areas of approximately equal size. For example, the segmentation engine can specify that each geo-area is a square kilometer, an acre, or other size. The segmentation engine 126 can, for example, segment the geographic map to generate geo-areas that include equal or approximately equal numbers of geographic locations. For example, the geo-caching data system 104 can register geographic locations as potential geo-points. The registered geographic locations are passed to the data processing system 102 in the geo-caching data 116. The data processing system 102 may, for example segment the geographic map into the geo-areas so that each geo-area includes an equal number or approximately equal number of the registered geographic areas.

The data processing system 102 can register geographic locations through the interface 120 to be considered as geo-points. For example, a mapping application associated with the data processing system 102 can automatically include geographic locations registered in the mapping application as potential geo-points. In some implementations, the geographic locations can register directly with the data processing system 102 to be considered as geo-points for the geo-caching data system 104 and other similar geo-caching data systems that are different from the geo-caching data system 104. The data processing system 102 can combine each list of the geographic locations and segment the geographic map to include approximately equal numbers of geographic locations in each geo-area.

The segmentation engine 126 may segment the geographic map according to the activity data of the location activity data cache 138. The activity data is part of the geo-caching data 116. As stated above, the activity data can include data indicative of how many terminal devices have interacted with a feature at a geo-point of the geo-caching data system 104. The data processing system 102 can gather activity data through the interface 120 using another application, such as a navigation application associated with the data processing system 102. For example, the data processing system 102 is in direct contact with the terminal device 106 and determine to which geographic locations the terminal device is proximate. In some implementations, the data processing system 102 can gather activity data from the geographic locations directly, such as through a registration interface.

The segmentation engine 126 uses the activity data to determine which areas of a geographic map are more active (i.e. which areas which are frequented by a greater number of people, or which areas users spend a greater amount of time in, for example) than other areas of a geographic map. The segmentation engine 126 can divide more active areas into a greater number of geo-areas so that more geo-points are located in the more active areas to achieve a load-balancing effect.

The segmentation engine 126 can receive metadata associated with each geographic location that is indicative of a type for each geographic location. The type of geographic location is indicative of a service or product of the geographic location. The segmentation engine 126 can segment the geographic map to ensure a diverse selection of types of geographic locations in each geo-area. In some implementations, two or more geographic locations are associated with one another. The segmentation engine 126 can segment the geographic map to prevent associated geographic locations from being in common geo-areas.

The segmentation engine 126 can segment the geographic map based on quality score data for the geographic locations. Quality score data is indicative of the quality of a geographic location for being a geo-point of the geo-caching data system 104. The quality score of a geographic location is based on one or more other data items associated with the geographic location and is generated by the data processing system 102.

The quality score for a geographic location is based on the type of geographic location. For example, a pedestrian-friendly geographic location can receive a higher quality score. A geographic location that is larger and can accommodate more users can have a higher quality score. The type of product or service of the geographic location can affect the quality score. A rating, review, etc. is used to determine the quality score of a geographic location. Activity data for a geographic location is used by the data processing system 102 to determine the quality score for the geographic location. In some implementations, machine learning approaches are used with the activity data to determine at which geographic locations users are likely to spend time. In some implementations, the quality score for each geographic location is stored in a quality score cache 140.

The quality score data is adjusted based on geo-caching data 116 received from the geo-caching data system 104. For example, if the geo-caching data system 104 reports a large number of conversions (e.g., purchases) related to the geo-point, an evaluation engine 122 can adjust the quality score for the geographic location associated with the geo-point. The quality score data is adjusted based on how long users spend at the geo-points and geographic locations. For example, if users spend a longer time at a geo-point, the quality score of the geographic location associated with the geo-point is increased. The data processing system 102 uses data received directly from terminal devices 106 to determine durations of visits to geographic locations and can adjust quality scores accordingly. In some implementations, the duration of user visits and type of geographic location are used together to adjust the quality score of a geographic location. For example, users may spend a longer time at a restaurant than at a coffee shop.

The segmentation engine 126 can segment the geographic map such that each geo-area includes a geographic location with a threshold quality score. The segmentation engine 126 can thus ensure that a minimum number of quality geographic locations are available in a geo-area to be geo-points of the geo-caching data system 104. In some implementations, the duration of user visits and type of geographic location are used together to adjust the quality score of a geographic location. For example, users may spend a longer time at a restaurant than at a coffee shop. The frequency of returning to a geo-point may also be considered. For example, a user may spend equal amounts of time at a coffee shop and an automotive oil changing business, but will likely return more frequently to a coffee shop.

The segmentation engine 126 can perform the load-balancing for the geo-areas in such a way as to ensure that an estimated level of user demand for each respective geo-area is maintained at or below a specified value or "load tolerance." For example, a geographic area can indicate a load tolerance per day, and the segmentation engine can segment the geographic map into geo-areas in accordance with the specified load tolerance. In some implementations, the load tolerance may be estimated according to population density, type of geographic location, or other data associated with the geographic locations. The level of demand for a respective geo-area may in turn be estimated based on the parameters akin to the distribution parameters discussed above; for example, the level of demand for a particular geo-area may be determined based on the geo-point density in that geo-area, the load levels from activity data within that geo-area, the population density within the geo-area, and so forth. The estimated level of demand may be expressed as an anticipated number of visits by users of the geo-caching data system 104 or other applications associated with the data processing system 102. The estimated demand may be expressed as a value or average of specified values for geographic locations of the geographic map.

Once the segmentation engine divides the geographic map into geo-areas, the geo-areas are stored in a geo-areas cache 136. Segmentation of the geographic may is further described below in relation to FIGS. 3A-3C.

The geo-points cache 134, the geo-areas cache 136, the location activity data cache 138, the quality scores cache 140, and an eligibility values cache 142 can each be keyed to associate each geographic location with a key and the type, activity data, quality score data, eligibility value data, geo-area data, and geo-point data for each geographic location with the respective key. The data from caches 134, 136, 138, 140, and 142 is used by the evaluation engine 122 during the evaluation process, as described below.

The data processing system 102 is configured to communicate with a number of eligibility value providers, such as eligibility value system 108. The eligibility value system 108 provides eligibility value data 146 to the data processing system 102 for use by the evaluation engine 122. The eligibility value system 108 includes a system representing one or more geographic locations. The eligibility value system 108 can register the geographic location with the data processing system 102 directly using interface 120. In some implementations, the eligibility value system 108 can register geographic location data 148 with the geo-caching data system 104, and the geographic location data 148 is passed to the data processing system 102 with the geo-caching data 116. The data processing system 102 stores the geographic location data 148 in one or more of caches 134, 136, 138, 140, 142.

The evaluation engine 122 (e.g., ad exchange) of the data processing system 102 performs an evaluation (e.g., auction) for each geo-area that determines which geographic location of the geo-area is associated with a geo-point. The evaluation engine receives eligibility value data 146 from the eligibility value system 108 for one or more geographic locations of the geo-area. The eligibility value data 146 includes eligibility values (e.g., bids) for the evaluation. The evaluation engine 122 uses the eligibility values for each geographic location to rank the geographic locations for a geo-area. A higher ranked geographic location (e.g., the highest ranked location) is selected by the evaluation engine. The data processing system 102 uses the GPS coordinates of the selected geographic location as a geo-point for the geo-area.

The evaluation engine 122 uses data from one or more of caches 134, 136, 138, 140, and 142 during the evaluation. In some implementations, the eligibility values are weighted by the quality scores of the quality score cache 140. The quality scores increase a probability that a desirable geographic location is selected as a geo-point, relative to performing an evaluation using unweighted eligibility values. Geographic locations with higher quality scores can have higher weights and be higher ranked by the evaluation engine 122 than geographic locations with lower quality scores. In some implementations, the weight of a quality score is proportional to the score.

Each geo-area includes at least one geo-point that represents the higher (e.g., highest) ranked geographic location of the evaluation. In some implementations, multiple geo-points are selected for each geo-area.

The evaluation engine 122 can perform an evaluation for one or more geo-areas in parallel to reduce latency of sending geo-point data 118 to the geo-caching data system 104. When a request for geo-points data 118 is received by the data processing system 102, the data processing system 102 can perform an evaluation using the evaluation 122, or send pre-loaded geo-points data 118 to the geo-caching data system 104 based on evaluations that have already been performed.

The frequency of evaluations of geographic locations of geo-areas impacts load (e.g., foot traffic) to the geographic locations. The evaluation engine 122 may perform evaluations at specified intervals or at a determined evaluation frequency to adjust the load to each geo-point. The data processing system 102 determines that activity data is indicative of reduced activity at one or more geo-points, which is indicative that users have already visited the geographic locations of the geo-points or otherwise have a reduced interest in visiting the geographic locations, which can affect the quality scores and rankings of the geographic locations in another evaluation.

Geographic locations often are interested in being a geo-point for a known (e.g., predetermined) period of time. For example, a geographic location desires to know some time in advance that the geographic location will be associated with a geo-point, and for what period of time and duration of time the geographic location is associated with the geo-point. For example, the geographic location can desire to be associated with the geo-point during a specific day, time of day, holiday, time of week, length of time, etc. The geographic location may wish to promote that it will be a geo-point in advance, that it will be a geo-point during regular intervals, etc. to entice users to visit the geographic location at desired times. In some implementations, the evaluation engine 122 performs the evaluation in advance of sending the geo-point data 118 to the geo-caching data system 104 using eligibility values received from the eligibility value system 108. The evaluation engine 122 performs the evaluations for each geo-area and reports, using evaluation results data 144, which geographic locations are geo-points and for what times and durations.

A timing engine 128 adjusts the frequency of evaluations by the evaluation engine 122 and segmentations by the segmentation engine 126 to manage loads for geo-points. For example, the segmentation engine 126 can specify a duration for which the geo-areas are set before another segmentations occurs, and provide this data to the eligibility value system 108, which may influence eligibility values (e.g., bid values). An evaluation schedule is created by the timing engine 128 that specifies for which durations of time the eligibility value system 108 is sending eligibility value data 146 and for how long the geographic location that is selected by the evaluation engine 122 is associated with a geo-point. In some implementations, the evaluation engine 122 performs evaluations according to the evaluation schedule rather than in response to a request for geo-point data 118 by the geo-caching data system 104. For example, the evaluation schedule can specify an evaluation period of one day, one week, etc., and the evaluation engine 122 performs an evaluation only once per geo-area per evaluation period. In some implementations, the geo-caching data system 104 can request updated geo-point data 118 at specified intervals. In some implementations, the data processing system 102 determines how often to update the geo-points data 118 based on activity data received.

The eligibility values are adjusted by the data processing system 102 based on the duration of the evaluation period and the size of the geo-area. For example, a higher eligibility value for a geographic location corresponds to a longer duration as being a geo-point or a larger geo-area associated with the geo-point. The eligibility value is higher for geo-areas with a single geo-point and lower for geo-areas with more than one geo-point. The eligibility value is higher for larger geo-areas (e.g., having more geographic locations) than smaller geo-areas (e.g., having fewer geographic locations). Eligibility values can be higher for particular periods of time during a day, week, month, etc. For example, the eligibility value system 108 can send a higher eligibility value for a duration of time associated with a happy hour, weekend, hours of operation, etc.

The eligibility values are adjusted by the data processing system 102 based on a tier score of the geo-caching data 116 and associated with the geo-points. The geo-caching data system 104 includes features of geo-points that have different tiers depending on the incentives the features create to users to interact with the geographic location. For example, a lowest tier score is indicative of a visit tier. The visit tier is associated with features of the geo-caching data system 104 that require users to visit the geographic location. A middle tier is indicative of a loiter tier. The loiter tier is associated with features of the geo-caching data system 104 that require users to visit the geographic location and loiter for a minimum duration. For example, the feature can require the user to take a threshold number of steps, wait a period of time within a threshold distance, etc. The loiter tier creates a greater incentive than the visit tier for users to interact with the geographic location (e.g., buy a product or service). A highest tier is indicative of a conversion tier. The conversion tier is associated with a feature of the geo-caching data system 104 that requires users to transact (e.g., purchase) at the geographic location. In some implementations, the eligibility values for higher tiers are higher than the eligibility values for lower tiers. Transactions can be verified by the geo-caching app when the user interacts with a near-field communication (NFC) beacon, scanning a barcode, etc. The geo-caching data system 104 can offer in-game rewards to the user in response to receiving verification data from the data processing system 102.

The evaluation engine 122 ranks the geographic locations for a geo-area, and ranked geographic locations are a subset of all geographic locations of the geographic map. The geographic locations of the subset are ranked according to their respective weighted eligibility scores. Higher-ranked geographic locations are better geographic locations for geo-points for their geo-area than lower-ranked geographic locations. The evaluation engine 122 ranks the geographic for each geo-area designated by the segmentation engine 126.

An aggregation engine 130 selects at least one geographic location from each subset of geographic locations for designating as a geo-point, wherein each subset of geographic locations consists of the geographic locations for a geo-area. In some implementations, the aggregation engine 130 selects a single geographic location from each geo-area to be a geo-point. In some implementations, the aggregation engine 130 selects multiple geographic locations from each geo-area to be geo-points. In some implementations, different numbers of geo-points are selected for different geo-areas.

The aggregation engine 130 generates geo-point data 118 indicative of the geo-points of the geo-caching data system 104 and sends the geo-point data to the geo-caching data system 104. In some implementations, the geo-point data 118 is associated with a specified time period for which the associated geo-points of the geo-data are active in the application of the geo-caching data system 104. The aggregation engine 130 can queue generated geo-point data 118 until a request for geo-point data is received from the geo-caching data system 104. In some implementations, the aggregation system 130 of the data processing system 102 can send the geo-point data 118 to the geo-caching data system 104 when the data are generated.

The aggregation engine 130 sends the evaluation results data 144 to the eligibility value system 108. The evaluation results data 144 includes which geographic locations are geo-points and for which periods of time the geographic locations are geo-points. For example, the evaluation results data 144 can include that geographic location A is a geo-point for geo-caching data system 104 on Monday from 8 AM-5 PM. In some implementations, the eligibility value system 108 informs the geographic location to prepare for the added load of having a geo-point nearby.

Figure 2:
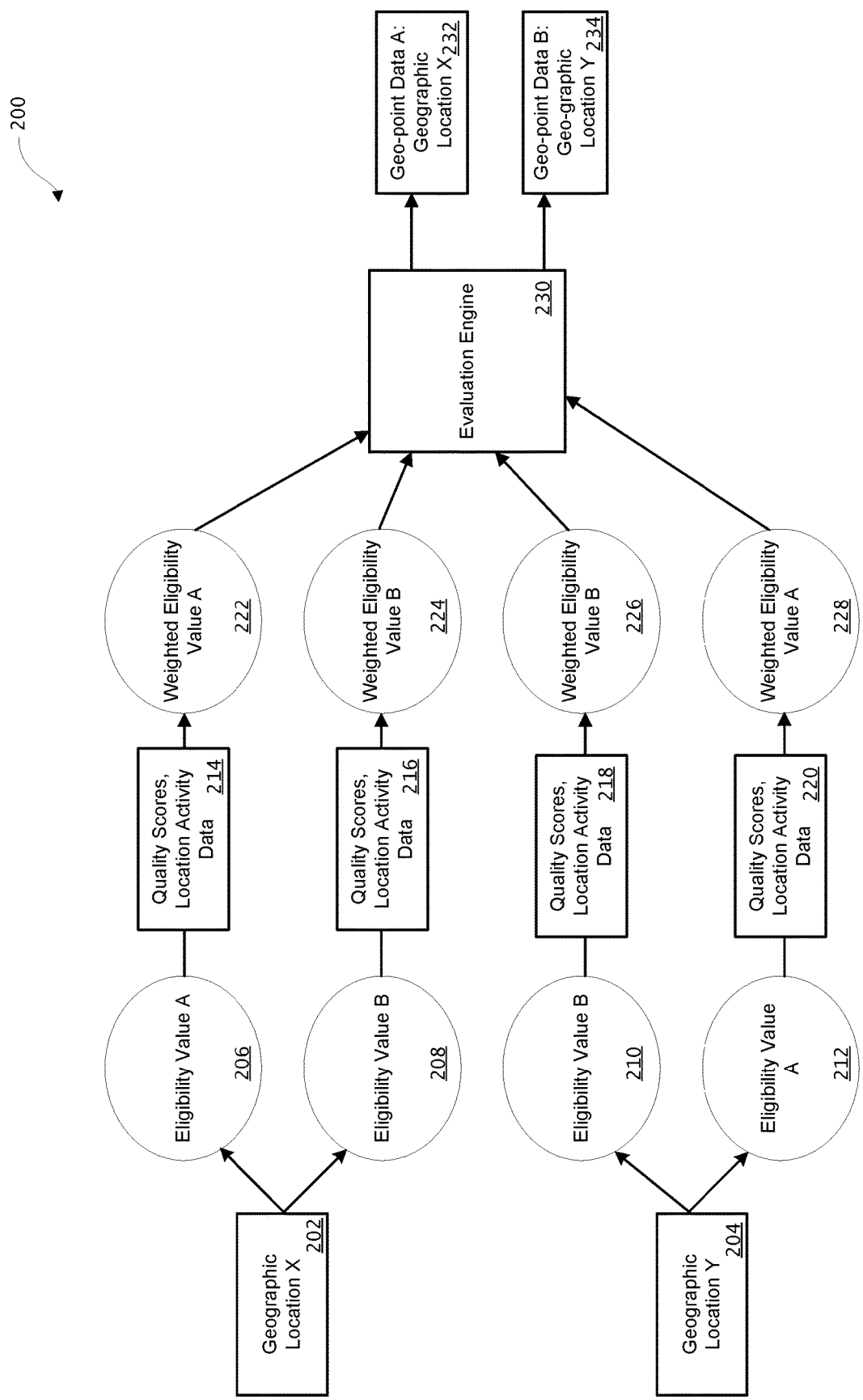
FIG. 2 shows a diagram of an evaluation process.

FIG. 2 includes a diagram showing an aggregation process 200. In cases where there are more than one geo-caching data system requesting geo-point data from the data processing system 102, an aggregation engine can aggregate geo-points across the different geo-caching data systems. For example, in cases where the geographic location is guaranteed to be the exclusive geo-point of a geo-area, a single evaluation is performed by an evaluation engine for all geo-caching data systems. A geographic location that is selected to be a geo-point for geo-caching data system A might not be selected for geo-caching data system B. Additionally, the aggregation engine considers load-balancing across all the geo-caching data systems. The aggregation considers a cumulative additional load that is incurred for a geographic location when the geographic location is assigned more than one geo-point, such as geo-point A of geo-caching data system A and geo-point B of geo-caching data system B.

In FIG. 2, an eligibility value system of geographic location 202 submits two eligibility values: eligibility value 206 for geo-caching data system A and eligibility value 208 for geo-caching data system B. Similarly, an eligibility value system of geographic location 204 submits eligibility value 210 for geo-caching data system A and eligibility value 212 for geo-caching data system B. Each eligibility value 206, 208, 210, 212 is weighted 214, 216, 218, 220 according to quality scores, activity data, etc. as described above in relation to FIG. 1. In some implementations, eligibility values are received in a format that is used for online digital content items (e.g., advertisements). An interface presented to systems associated with the geographic locations can be the same for the data processing system 102 as for other evaluation processes for the online digital content items. The weighted eligibility values 222, 224, 226, and 228 are evaluated by an evaluation engine 230. For geo-caching data system A, geographic location X is awarded a geo-point 232. For geo-caching data system B, geographic location Y is awarded a geo-point 234. In some implementations, all weighted eligibility values 222, 224, 226, 228 are considered together by the evaluation engine 230, and eligibility values are adjusted accordingly. In some implementations, separate evaluations are performed for geo-caching data system A and geo-caching data system B. In this way, a set number of geo-points can be chosen across a number of geo-caching data systems, which can load-balance the geo-points.

Figure 3A:
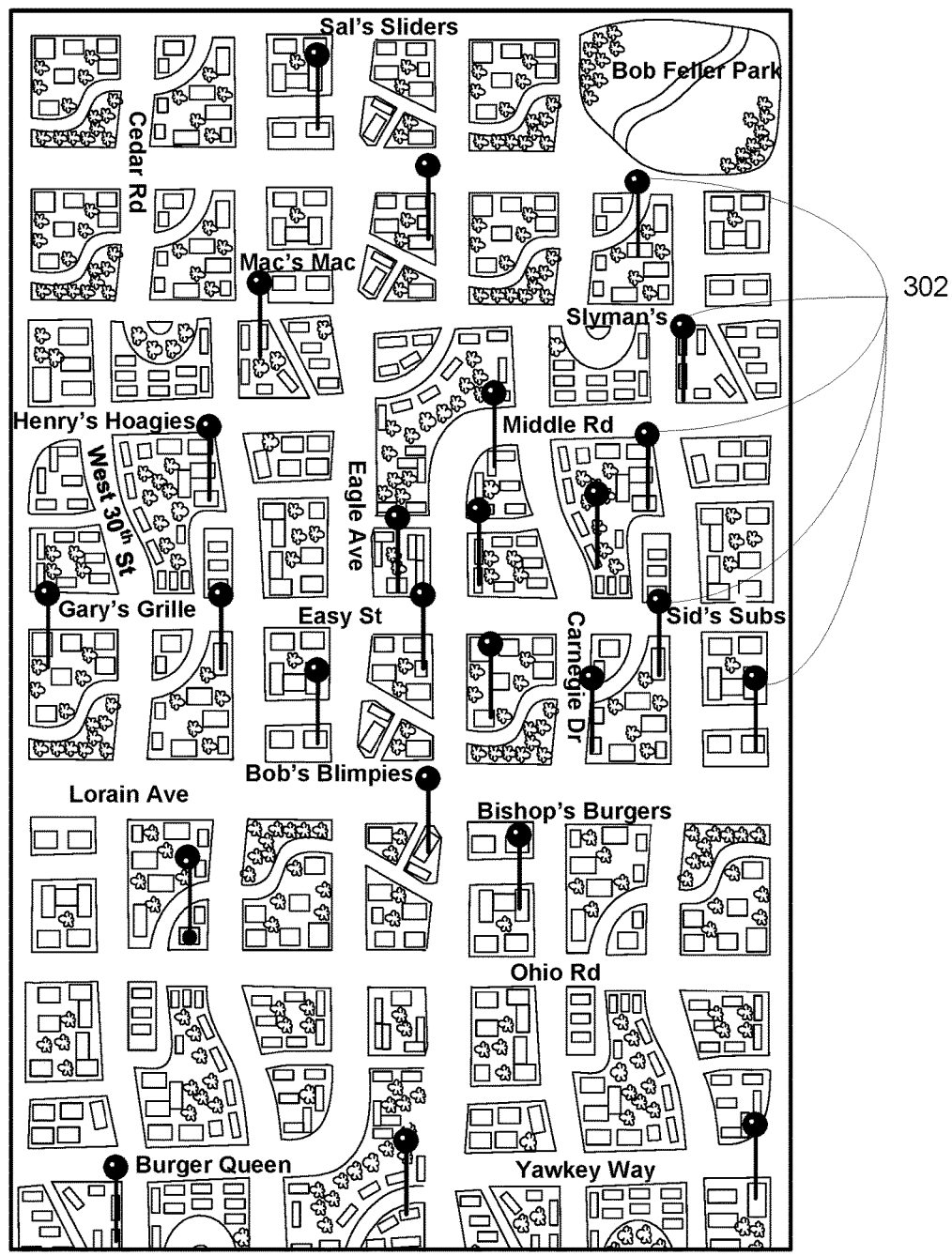
FIGS. 3A-3C are geographic maps for logical segmentation data processing.
Figure 3B:
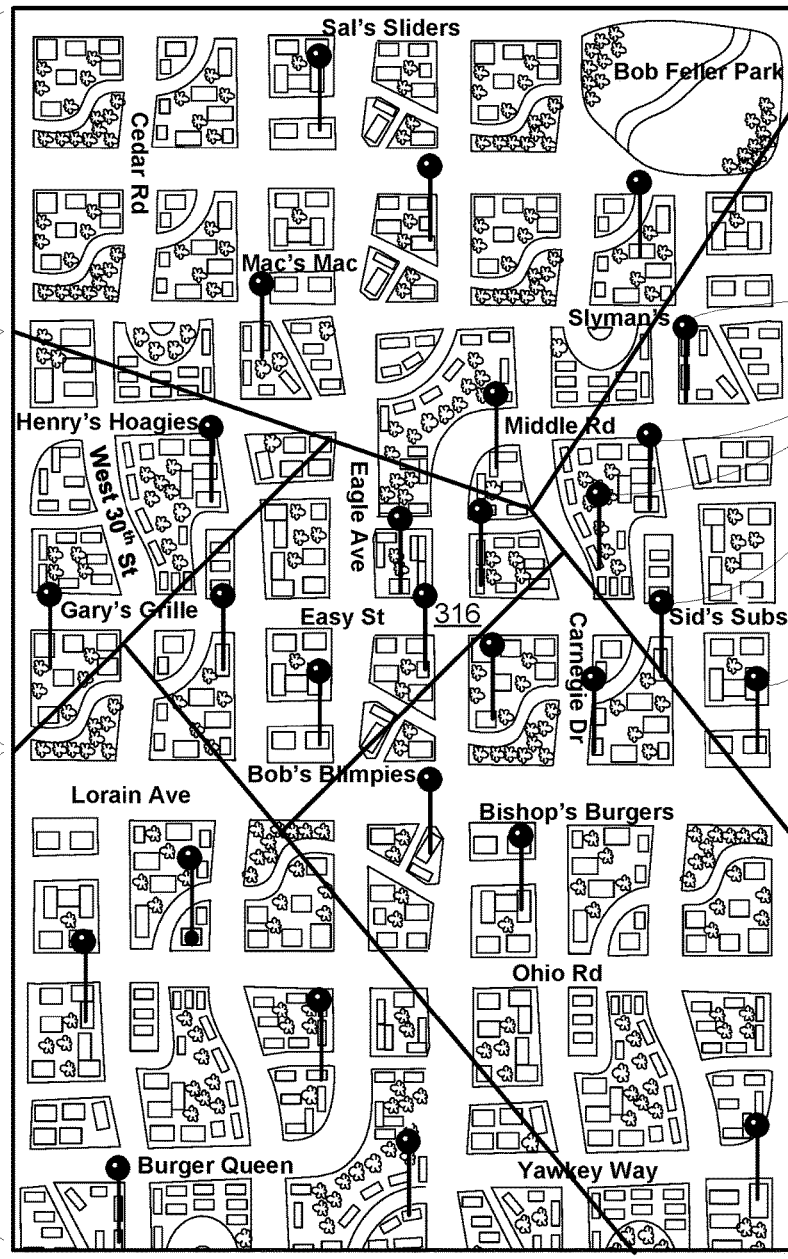
Figure 3C:
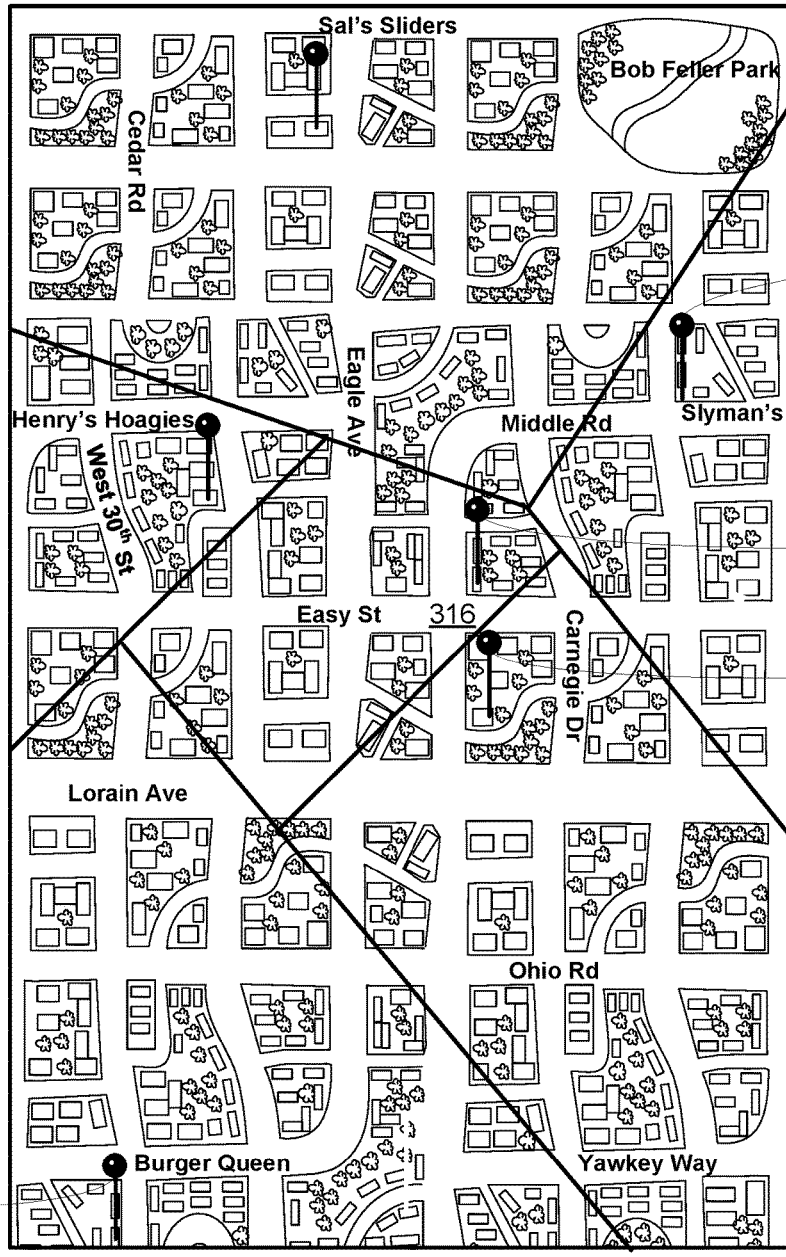

FIGS. 3A-3C show example geographic maps 310, 320, and 330, respectively, of an application on a terminal device (e.g., terminal device 106). The geographic maps 300, 310, 320 represent the segmentation process being performed by the data processing system (e.g., data processing system 102 of FIG. 1).

In FIG. 3A, geographic map 300 shows a plurality of geographic locations 302 which are represented as pins on the geographic map 300. Though only a portion of the pins are labeled 302, each pin is a geographic location. The geographic locations can be registered with the geo-caching data system, registered with another application associated with the data processing system, or both, as described above. The geographic locations 302 have varying density across the geographic map 300. For example, near commercial zones, there are likely to be more locations than near parks or residential zones.

FIG. 3B shows geographic map 302 after being divided into geo-areas, such as by a segmentation engine (e.g., segmentation engine 126 of FIG. 1). The geo-areas 304, 306, 308, 310, 314, 316 are examples of possible geo-areas that can be drawn by the segmentation engine. However, other geo-areas are possible. For example, the geo-areas can be uniform in size, shape, number of geographic locations, etc. as described above. In this example, geo-areas 304, 306, 310, 314, and 316 each include five geographic locations, while geo-area 308 includes two. Geographic locations 312 are ranked by the evaluation engine (e.g., evaluation engine 122 of FIG. 1) for determining which geographic location(s) are associated with geo-points for geo-area 306. Each of segments 304, 306, 308, 310, 314, 316 can be evaluated in parallel.

FIG. 3C shows geographic map 330 after evaluations have been performed for each geo-area 304, 306, 308, 310, 314, 316. For example, geographic location 318 is a geo-point for geo-area 306, geographic location 320 is a geo-point for geo-area 316, geographic location 322 is a geo-point for geo-area 314, and geographic location 324 is a geo-point for geo-area 310. In this example, geo-points 320 and 322 are relatively close together geographically compared to other geographic locations. As described above, this could be because of higher amounts of foot-traffic near geographic locations 320, 322 that requires load-balancing to distribute the region between two geo-areas. Geographic location 324 is relatively distant from other geo-points. As described above, this could be because geo-area 310 has lower amounts of foot traffic relative to other geo-areas.

Figure 4:
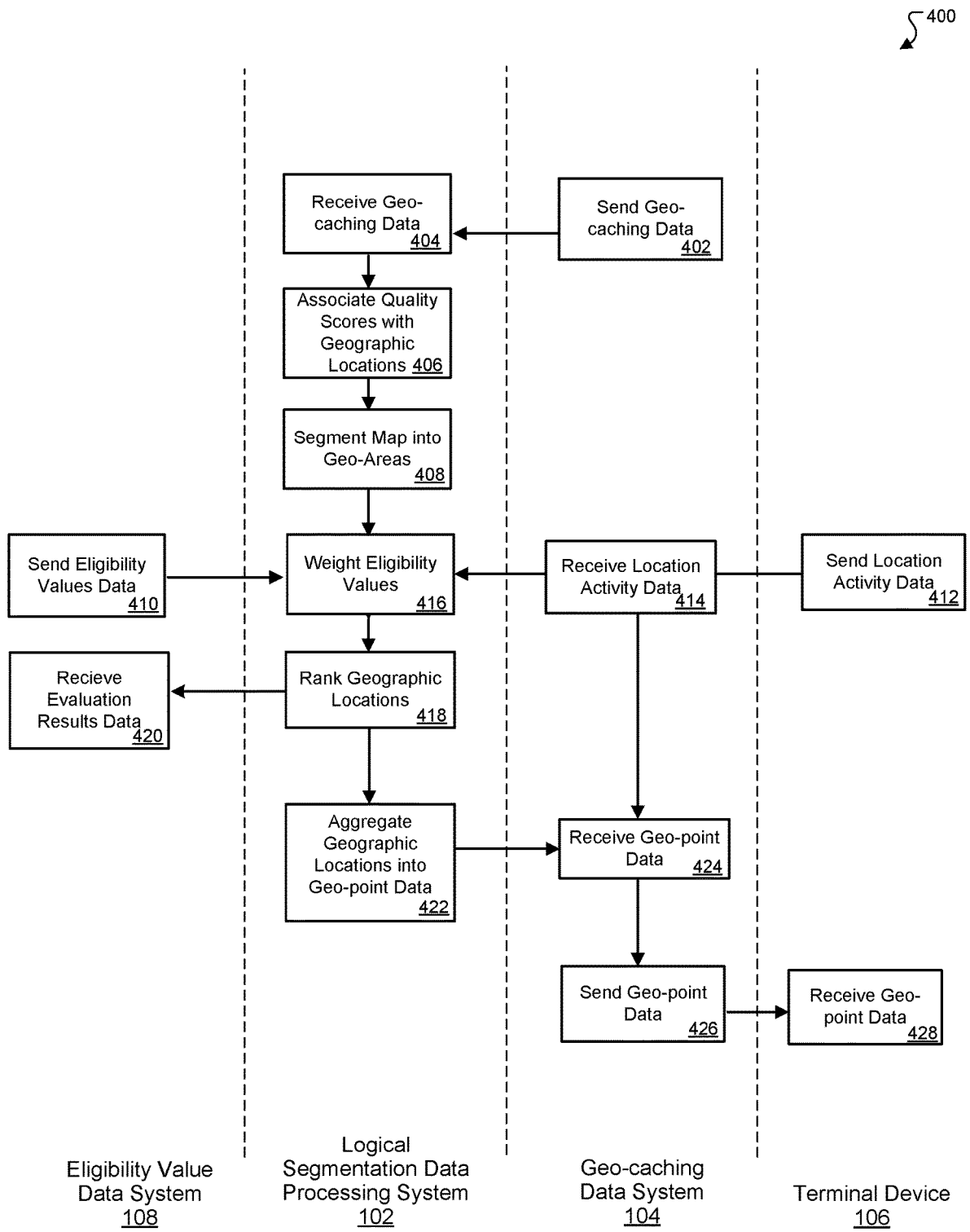
FIG. 4 is a diagram showing actions taken for logical segmentation data processing.

FIG. 4 includes a diagram 400 showing actions taken for logical segmentation data processing. The geo-caching data system 104 sends (402) geo-caching data to the data processing system 102. The data processing system 102 receives (404) the geo-caching data. The data processing system 102 associates (406) quality scores with geographic locations of the geo-caching data. The data processing system 102 segments (408) the geographic map into geo-areas. The eligibility value system 108 sends eligibility values to the data processing system 102. The data processing system 102 weights the eligibility values as described above. The data processing system 102 ranks (418) the geographic locations. The eligibility value system 108 receives (420) the eligibility value data from the data processing system 102. The data processing system 102 aggregates (422) the ranked geographic locations to generate geo-point data. The geo-caching data system 104 receives (424) the geo-point data from the data processing system 102. The geo-caching data system 104 sends (426) the geo-point data to the terminal device 106. The terminal device receives (428) the geo-point data. A user of the terminal device 106 can see and interact with the geo-caching data system application at the geo-point.

Figure 5:
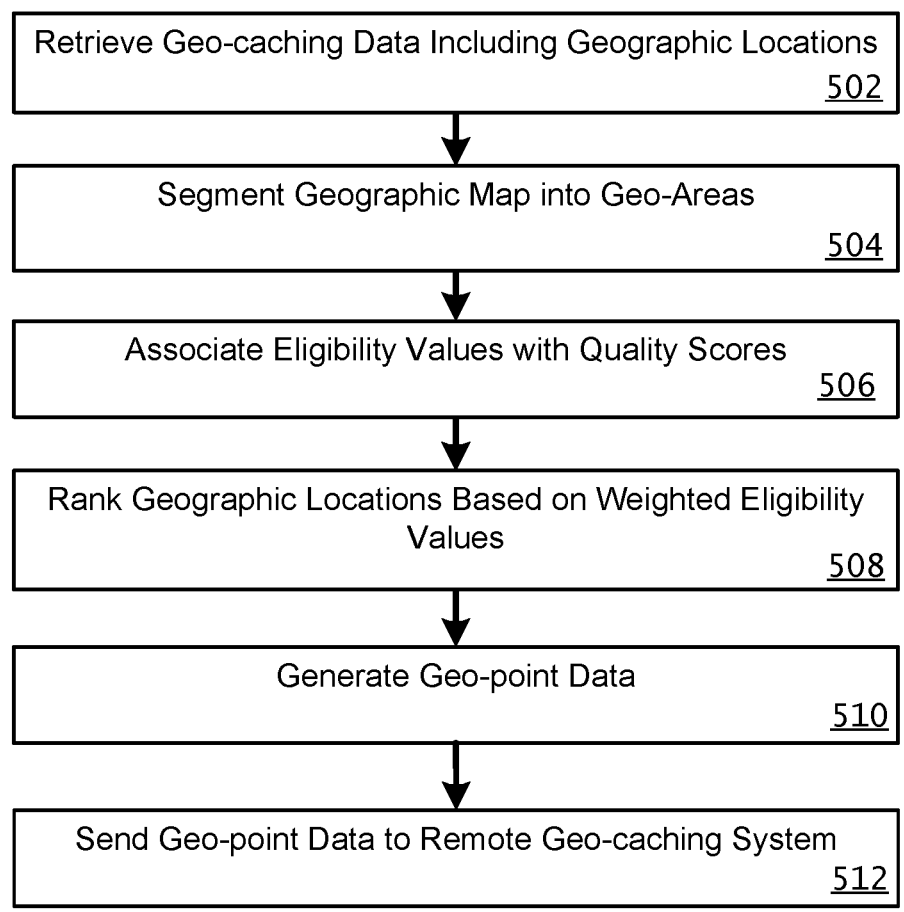
FIG. 5 is a flow diagram showing actions taken for logical segmentation data processing.

FIG. 5 shows a process 500 for taken for logical segmentation data processing. The data processing system (e.g., data processing system 102 of FIG. 1) receives (502) the geo-caching data including geographic locations. The data processing system segments (504) the geographic map into geo-areas. The data processing system associates (506) eligibility values with quality scores. The data processing system ranks (510) the geographic locations based on weighted eligibility values. The data processing system generates (512) geo-point data. The data processing system sends (412) the geo-point data to a remote geo-caching system.

Figure 6:
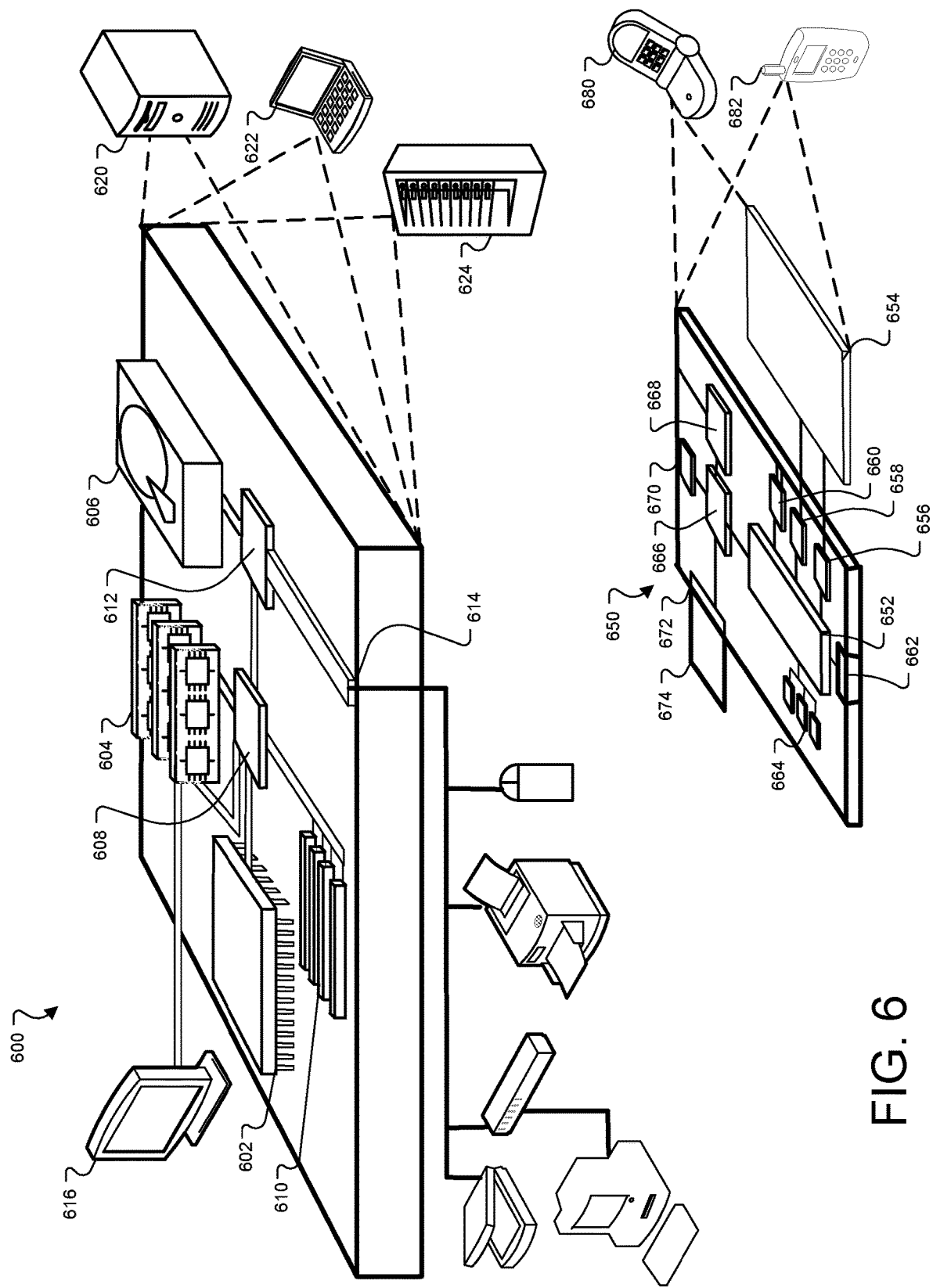
FIG. 6 is a block diagram of components of a system for logical segmentation data processing.

FIG. 6 shows example computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally, computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic, computer-readable hardware storage device or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be in communication with processor 652, so as to enable near area communication of device 650 with other devices. External interface 662 may provide, for example, for wired communication, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for logical data segmentation may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A logical segmentation data processing system that processes data representing geographic locations for segmentation into subsets, comprising:

a data retrieval interface that receives, from a remote geo-caching data system, geo-caching data representing geographic locations specified by the remote geo-caching data system;

storage for storing quality score data for each of the geographic locations represented by the geo-caching data;

a logical segmentation engine that segments a geographic map into geo-areas based at least in part on the quality score data for the geographic locations, each geo-area comprising a subset of the geographic locations represented by the geo-caching data, wherein each subset of the geographic locations for each geo-area contains fewer than all of the geographic locations within the geo-area, and wherein the segmenting results in each geo-area having an anticipated number of visits by users of the geo-caching system that meets a specified threshold;

an evaluation engine that ranks, for each of a plurality of the geo-areas, geographic locations of that geo-area, with each geographic location being scored with an eligibility value, and with ranking being a function of eligibility values of the geographic locations, wherein the eligibility values are each weighted based on quality score data for the geographic locations; and an aggregation engine that selects, as a geo-point for an interactive feature of the geo-caching data system from each of the plurality of the geo-areas, a geographic location with a higher ranking, relative to one or more other rankings of one or more other geographic locations in that ranking.

2. The logical segmentation data processing system of claim 1, wherein the aggregation engine generates geo-point data by generating a geo-point for coordinates of each of the selected geographic locations with higher rankings and sends the geo-point data to the remote geo-caching data system.

3. The logical segmentation data processing system of claim 2, wherein each geo-point of the geo-point data is associated with data representing one or more interactive features being accessible by a terminal device configured to communicate with the remote geo-caching data system.

4. The logical segmentation data processing system of claim 2, wherein the geo-caching data represents geographic locations from the remote geo-caching data system and another remote geo-caching data system, and wherein the aggregation engine sends the geo-point data to the remote geo-caching data system and the other remote geo-caching data system.

5. The logical segmentation data processing system of claim 3, wherein the storage comprises a database that stores activity data associated with each of the geographic locations represented by the geo-caching data, the activity data representing how often the one or more interactive features are accessed by one or more terminal devices configured to communicate with the remote geo-caching data system.

6. The logical segmentation data processing system of claim 3, wherein the quality score data for a geographic location represents a probability that the terminal device configured to communicate with the remote geo-caching data system requests data associated with the geographic location.

7. The logical segmentation data processing system of claim 3, wherein the quality score data is based on a length of time during which the terminal device requests data associated with the geographic location.

8. The logical segmentation data processing system of claim 5, wherein the eligibility values are each weighted proportionally to a value representing an amount of activity indicated by the activity data for each of the geographic locations.

9. The logical segmentation data processing system of claim 5, further comprising a timing engine that determines, for a geo-area, an evaluation schedule for the evaluation engine to rank the plurality of the geographic locations.

10. The logical segmentation data processing system of claim 9, wherein the timing engine determines a duration of time according to the evaluation schedule, and wherein the logical segmentation engine segments the geographic map into alternative geo-areas at least once during the duration of time.

11. The logical segmentation data processing system of claim 1, wherein the logical segmentation engine further determines a size of the geo-area based on a number of the geographic locations represented by the geo-caching data.

12. The logical segmentation data processing system of claim 1, wherein each geo-area comprises a predetermined number of geographic locations.

13. The logical segmentation data processing system of claim 1, wherein each geographic location specified by the remote geo-caching data system is associated with a tier score for the geographic location, and wherein an eligibility value for the geographic location is weighted proportionally to the tier score.

14. The logical segmentation data processing system of claim 13, wherein the tier score specifies a conversion quality of the geographic location comprising one of:
a first tier indicative of an interactive feature for the remote geo-caching data system being associated with the geographic location;
a second tier indicative of the interactive feature for the remote geo-caching data system that comprises a time-based reward; and
a third tier indicative of the interactive feature for the remote geo-caching data system that comprises a transaction at the geographic location.

15. A method for processing data representing geographic locations for segmentation into subsets, comprising:
receiving, by a data retrieval interface, from a remote geo-caching data system, geo-caching data representing geographic locations specified by the remote geo-caching data system;
storing quality score data for each of the geographic locations represented by the geo-caching data;
segmenting a geographic map into geo-areas based at least in part on the quality score data for the geographic locations, each geo-area comprising a subset of the geographic locations represented by the geo-caching data, wherein each subset of the geographic locations for each geo-area contains fewer than all of the geographic locations within the geo-area, and wherein the segmenting results in each geo-area having an anticipated number of visits by users of the geo-caching system that meets a specified threshold;
ranking, for each of a plurality of the geo-areas, geographic locations of that geo-area, with each geographic location being scored with an eligibility value, and with the ranking being a function of eligibility values of the geographic locations, wherein the eligibility values are each weighted based on quality score data for the geographic locations; and
selecting, as a geo-point for an interactive feature of the geo-caching data system from each of the plurality of the geo-areas, a geographic location with a higher ranking, relative to one or more other rankings of one or more other geographic locations in that ranking.

16. The method of claim 15, further comprising generating geo-point data by generating a geo-point for coordinates of each of the selected geographic locations with higher rankings and sends the geo-point data to the remote geo-caching data system.

17. The method of claim 16, wherein each geo-point of the geo-point data is associated with data representing one or more interactive features being accessible by a terminal device configured to communicate with the remote geo-caching data system.

18. The method of claim 16, wherein the geo-caching data represents geographic locations from the remote geo-caching data system and another remote geo-caching data system.

19. The method of claim 17, further comprising storing activity data associated with each of the geographic locations represented by the geo-caching data, the activity data representing how often the one or more interactive features are accessed by one or more terminal devices configured to communicate with the remote geo-caching data system.

20. The method of claim 17, wherein the quality score data for a geographic location represents a probability that the terminal device configured to communicate with the remote geo-caching data system requests data associated with the geographic location.

21. The method of claim 17, wherein the quality score data is based on a length of time during which the terminal device requests data associated with the geographic location.

22. The method of claim 19, wherein the eligibility values are each weighted proportionally to a value representing an amount of activity indicated by the activity data for each of the geographic locations.

23. The method of claim 19, further determining, for a geo-area, an evaluation schedule for ranking the plurality of the geographic locations.

24. The method of claim 23, further comprising determining a duration of time according to the evaluation schedule; and
segmenting the geographic map into alternative geo-areas at least once during the duration of time.

25. The method of claim 15, further comprising determining a size of the geo-area based on a number of the geographic locations represented by the geo-caching data.

26. The method of claim 15, wherein each geo-area comprises a predetermined number of geographic locations.

27. The method of claim 15, wherein each geographic location is associated with a tier score for the geographic location, and wherein an eligibility value for the geographic location is weighted proportionally to the tier score.

28. The method of claim 27, wherein the tier score specifies a conversion quality of the geographic location comprising one of:
a first tier indicative of an interactive feature for the remote geo-caching data system being associated with the geographic location;
a second tier indicative of the interactive feature for the remote geo-caching data system that comprises a time-based reward; and
a third tier indicative of the interactive feature for the remote geo-caching data system that comprises a transaction at the geographic location.

29. A non-transitory computer readable medium storing instructions that are executable by one or more processors configured to perform operations comprising:

receiving, from a remote geo-caching data system, geo-caching data representing geographic locations specified by the remote geo-caching data system;

storing quality score data for each of the geographic locations represented by the geo-caching data;

segmenting a geographic map into geo-areas based at least in part on the quality score data for the geographic locations, each geo-area comprising a subset of the geographic locations represented by the geo-caching data, wherein each subset of the geographic locations for each geo-area contains fewer than all of the geographic locations within the geo-area, and wherein the segmenting results in each geo-area having an anticipated number of visits by users of the geo-caching system that meets a specified threshold;

ranking, for each of a plurality of the geo-areas, geographic locations of that geo-area, with each geographic location being scored with an eligibility value, and with the ranking being a function of eligibility values of the geographic locations, wherein the eligibility values are each weighted based on quality score data for each of the geographic locations; and selecting, as a geo-point for an interactive feature of the geo-caching data system from each of the plurality of the geo-areas, a geographic location with a higher ranking, relative to one or more other rankings of one or more other geographic locations in that ranking.

\* \* \* \* \*

UNITED STATES PATENT AND TRADEMARK OFFICE
CERTIFICATE OF CORRECTION

| | | |
|---|---|---|
| PATENT NO. | : 10,565,237 B2 | Page 1 of 1 |
| APPLICATION NO. | : 15/549922 | |
| DATED | : February 18, 2020 | |
| INVENTOR(S) | : Hui et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 188 days.

Signed and Sealed this
Twenty-fourth Day of November, 2020

Andrei Iancu
*Director of the United States Patent and Trademark Office*